United States Patent [19]
Vivian

[11] 4,320,014
[45] Mar. 16, 1982

[54] ACIDIFICATION OF SUBTERRANEAN FORMATIONS EMPLOYING HALOGENATED HYDROCARBONS

[75] Inventor: Thomas A. Vivian, Midland, Mich.

[73] Assignee: The Dow Chemical Company, Midland, Mich.

[21] Appl. No.: 195,979

[22] Filed: Oct. 10, 1980

[51] Int. Cl.³ .............................................. E21B 43/27
[52] U.S. Cl. .................................. 252/8.55 C; 166/300
[58] Field of Search ............... 252/8.55 C; 166/300, 166/307; 570/102, 227, 228

[56] References Cited

U.S. PATENT DOCUMENTS

| | | | |
|---|---|---|---|
| 2,308,903 | 1/1943 | Wimmer | 570/227 |
| 3,215,199 | 11/1965 | Dilgren | 166/300 X |
| 3,297,090 | 1/1967 | Dilgren | 166/300 |
| 3,307,630 | 3/1967 | Dilgren et al. | 166/300 |
| 3,763,017 | 10/1973 | Yves et al. | 570/102 |
| 4,148,360 | 4/1979 | Watanabe | 252/8.55 X |

*Primary Examiner*—Herbert B. Guynn
*Attorney, Agent, or Firm*—A. C. Ancona

[57] ABSTRACT

The in situ production of hydrochloric acid in a subterranean formation to increase the flow of gas or oil therefrom by decomposing a polyhalohydrocarbon in the formation is accomplished at lower temperature by injecting the polyhalohydrocarbon together with isopropyl alcohol or a Lewis acid, e.g. $FeCl_3$, or a mixture of the alcohol and Lewis acid.

1 Claim, No Drawings

ACIDIFICATION OF SUBTERRANEAN FORMATIONS EMPLOYING HALOGENATED HYDROCARBONS

BACKGROUND OF THE INVENTION

The acidification of wells is the process for restoring permeability of subterranean formations by treating the formations with an acid, usually hydrochloric. Problems associated with acidification usually include corrosion of the well equipment and reactivity of the acid with the material immediately surrounding the well bore hole. To overcome these problems it is known to the art to use halogenated hydrocarbons as in situ sources of hydrochloric acid. For example U.S. Pat. No. 3,215,199 discloses the use of organic halides together with an alcohol and water which will provide HCl as a decomposition product in the formation. The advantage is that such decomposition occurs only slowly or not at all at ambient temperatures, but when such a treating composition reaches the temperatures present in the formation, decomposition occurs. The halogenated hydrocarbons taught in the '199 patent are the alkyl chlorides, bromides and iodides, such as the propyl chlorides, t-butyl chloride, allyl chloride, t-butyl iodide, epichlorohydrin, dihydroxychloropropane and the like. The alcohols taught therein are methyl, ethyl, isopropyl, butyl and the higher homologous alcohols as well as unsaturated alcohols such as allyl alcohol.

Another method of increasing the flow of fluids through a formation is disclosed in U.S. Pat. No. 3,288,216 wherein 1,1,1-trichloroethane is introduced into the well formation followed by an aromatic hydrocarbon solvent, eg toluene, and thereafter by an alcohol, preferably methanol. Such treatment is said to remove flow restricting materials from the formation.

A variation on the method of the '199 patent is disclosed in U.S. Pat. No. 3,297,090 wherein in aliphatic monochloride, together with an aqueous solution of an aliphatic alcohol and a catalyst containing cuprous ion, e.g. cuprous chloride, is injected to produce hydrochloric acid in the formation. U.S. Pat. No. 3,307,630 teaches the use of a reducing agent in addition to the cuprous ion to maintain it in that condition, i.e. the reducing agent converts any cupric ions produced back to the cuprous form.

In a more recent patent, U.S. Pat. No. 4,148,360, a method of acidizing employing $C_1$ and $C_2$ polyhalogenated aliphatic compounds, such as carbon tetrachloride, chloroform, tetrachloroethane, pentachloroethane, bromotrichloroethane, tetrabromoethane, dibromotrifluoroethane and the like polyhalo compounds. Water is also separately introduced into the formation to aid in the decomposition of the halogen hydrocarbon. The well is then "shut in" for a period of time sufficient to allow the acid to form and acidize the formation. This process is said to be useful in wells wherein the temperatures are in the range of 250° to 700° F. (or about 120° to 370° C.). U.S. Pat. No. 4,203,492 employs an aqueous solution of an alkali metal or ammonium fluoride salt and a liquid acid precursor, e.g. a halogenated $C_1$ or $C_2$ hydrocarbon, to produce a hydrohalic acid, which, in combination with the fluoride salt attacks the formation.

The present invention is an improvement which allows the treatment (acidizing) to take place more rapidly and at lower temperatures, thus allowing treatment of shallower wells.

The invention also provides for more complete reaction, thus preventing the release of chlorocarbon into the information as a potential contaminant of ground water.

SUMMARY OF THE INVENTION

The present invention is an improvement in the in situ production of a hydrohalic acid in a subterranean formation for the purpose of acidizing the formation to improve the flow of gas or oil therefrom. A polyhalocarbon is injected as a mixture with water together with isopropyl alcohol and/or a Lewis acid catalyst, preferably $FeCl_3$, into the formation.

DETAILED DESCRIPTION OF THE INVENTION

The purpose of the present invention is to increase the effectiveness of these in situ treatments with halogenated hydrocarbons by introducing a catalyst or an initiator to speed the degradation reaction and drive it toward completion.

Catalysts, or initiators, useful in the practice of the invention are metal halides, e.g. aluminum chloride, zinc chloride, ferric chloride.

Water is employed in excess of stoichiometric quantities with a lower alcohol, preferably isopropyl alcohol, or ferric chloride or a mixture of the alcohol and ferric chloride.

It is known that the hydrolysis of the halocarbon will take place more rapidly in an aqueous phase than in a non-aqueous phase. Thus, alcohol promotes the reaction by increasing the dispersion of the polyhalocarbon in the water.

The ratio of water to polyhalocarbon is from about 2.5/1 to about 6000 to 7000/1.

The resultant advantages of this invention include speed of treatment, less solvent required, lower risk of ground water contamination. The temperatures at which an exotherm occurs are as low as 200° C. and less. The exotherm is an indication of the decomposition of the polyhalocarbon and the formation of HCl.

In testing various combinations of catalysts and chlorinated solvents to determine their applicability in acidizing wells a differential scan calorimeter (DSC), was employed. The commercial unit used was DSC Model No. 910, marketed by the DuPont Company, with a No. 990 controller.

A glass ampoule containing a one to three-gram sample of the material to be tested was placed in the calorimeter. The calorimeter was heated to a temperature of 430° C. during the test. If no exotherm occurred up to that temperature, the test was discontinued. Temperature probes were used to measure the temperature of the ampoule and of the calorimeter. The difference between the two was recorded so as to determine the initiation temperature of the exotherm and peak temperature attained. The area under the curve was a measure of the heat produced by the decomposition of the chlorinated solvent.

The following Table shows the compositions tested and the temperature required to initiate the exotherm.

| Components | Weight Ratios | Exotherm Initiation Temp. (°C.) |
| --- | --- | --- |
| $CCl_4/H_2O/FeCl_3$ | 2/5/0.6 | 185 |

-continued

| Components | Weight Ratios | Exotherm Initiation Temp. (°C.) |
|---|---|---|
| $CCl_4/H_2O/i\text{-}PrOH$ | 2/5/1 | 216 |
| $CCl_4/H_2O/AlCl_3$ | 2/5/0.6 | NR* |
| $CCl_4/H_2O/i\text{-}PrOH/FeCl_3$ | 2/5/1/0.6 | 213 |
| $CCl_4/H_2O\ i\text{-}PrOH/FeCl_3$ | 2/5/1/0.04 | 323 |
| $CCl_4/H_2O/CuCl_2$ | 2/5/0.6 | NR |
| $CCl_4/H_2O/FeCl_3$ | 2/5/0.04 | NR |

*NR indicates that no reaction occurred under the conditions of the test.

It should be noted that neither aluminum nor copper chlorides catalyze the reaction at the same level as the iron chloride does.

The temperature increases in proportion to the depth of the well and due to the lower temperatures occurring in the shallower wells, such in situ acidizing treatments have been either impossible or have taken an unduly long time of being "shut in". The present invention has made it possible to treat the shallower wells and in a relatively shorter time.

The method of the present invention, therefore, is an improvement in acidizing wells in situ by injecting a polyhalocarbon together with water and a catalytic amount of iron chloride into the well. Alternatively and preferably a lower alcohol, e.g. isopropyl alcohol, is employed in an amount equimolar with the polyhalocarbon. Carbon tetrachloride is the preferred source of the acidizing acid.

I claim:

1. In the in situ acidizing of a subterranean formation by decomposing a halohydrocarbon, the improvement which comprises introducing into said formation a mixture of carbon tetrachloride, water, isopropyl alcohol and ferric chloride, wherein the weight ratio of carbon tetrachloride to water to isopropyl alcohol to ferric chloride is from 2/5/1/0.04 to about 2/14,000/1/0.6.

* * * * *